(12) United States Patent
Keithley et al.

(10) Patent No.: US 7,527,195 B2
(45) Date of Patent: May 5, 2009

(54) METHOD AND SYSTEM FOR RISK MANAGEMENT IN A TRANSACTION

(75) Inventors: Thomas H. Keithley, Monkton, MD (US); Vincent W. Talbert, Cockeysville, MD (US); Mark L. Lavelle, Govans, MD (US)

(73) Assignee: Bill Me Later, Inc., Timonium, MD (US)

( * ) Notice: Subject to any disclaimer, the term of this patent is extended or adjusted under 35 U.S.C. 154(b) by 140 days.

(21) Appl. No.: 11/102,941

(22) Filed: Apr. 11, 2005

(65) Prior Publication Data

US 2006/0226216 A1 Oct. 12, 2006

(51) Int. Cl.
  *G06K 5/00* (2006.01)
(52) U.S. Cl. ...................... 235/380; 235/382
(58) Field of Classification Search ............... 235/380, 235/382, 382.5, 492, 493, 486, 383, 381, 235/375; 705/38, 39, 1, 26, 7, 4
See application file for complete search history.

(56) References Cited

U.S. PATENT DOCUMENTS

| | | | |
|---|---|---|---|
| 3,920,908 A | 11/1975 | Kraus | |
| 4,191,860 A | 3/1980 | Weber | |
| 4,291,198 A | 9/1981 | Anderson et al. | |
| 4,757,267 A | 7/1988 | Riskin | |
| 4,969,183 A | 11/1990 | Reese | |
| 4,996,705 A | 2/1991 | Entenmann et al. | |
| 5,010,238 A | 4/1991 | Kadono et al. | |
| 5,012,077 A | 4/1991 | Takano | |
| 5,120,945 A | 6/1992 | Nishibe et al. | |
| 5,329,589 A | 7/1994 | Fraser et al. | |
| 5,446,885 A * | 8/1995 | Moore et al. ............ | 707/103 R |
| 5,537,315 A | 7/1996 | Mitcham | |
| 5,793,028 A | 8/1998 | Wagener et al. | |
| 5,794,221 A | 8/1998 | Egendorf | |
| 5,866,889 A | 2/1999 | Weiss et al. | |
| 5,870,721 A | 2/1999 | Norris | |
| 5,883,810 A | 3/1999 | Franklin et al. | |
| 5,940,811 A | 8/1999 | Norris | |
| 6,000,832 A | 12/1999 | Franklin et al. | |

(Continued)

FOREIGN PATENT DOCUMENTS

EP  0 338 568 A2  10/1989

(Continued)

OTHER PUBLICATIONS

Amilda Dymi, *A One-Stop Shopping Trip That Can Pay Off Over Time*; Origination News, New York, Sep. 2003; vol. 12, Iss. 12, p. 5.

*Primary Examiner*—Thien M Le
(74) *Attorney, Agent, or Firm*—The Webb Law Firm

(57) ABSTRACT

Disclosed is a risk management system for providing risk data to an entity engaged in a transaction with a consumer. The system includes an authorization denial system having an authorization denial system interface for receiving a transaction data set having a plurality of data fields from the entity; and a denial rule set with multiple rules for outputting risk data directed to the transaction based upon the result of applying the rules to the data fields in the transaction data set. The authorization denial system interface transmits the resulting risk data to the entity. A method of authorizing a transaction between a consumer and an entity is also disclosed.

26 Claims, 2 Drawing Sheets

U.S. PATENT DOCUMENTS

| | | | |
|---|---|---|---|
| 6,029,150 | A | 2/2000 | Kravitz |
| 6,029,890 | A | 2/2000 | Austin |
| 6,032,136 | A | 2/2000 | Brake, Jr. et al. |
| 6,078,891 | A | 6/2000 | Riordan et al. |
| 6,098,053 | A | 8/2000 | Slater |
| 6,105,007 | A | 8/2000 | Norris |
| 6,122,624 | A | 9/2000 | Tetro et al. |
| 6,188,994 | B1 | 2/2001 | Egendorf |
| 6,202,053 | B1 | 3/2001 | Christiansen et al. |
| 6,227,447 | B1 | 5/2001 | Campisano |
| 6,289,319 | B1 | 9/2001 | Lockwood |
| 6,317,783 | B1 | 11/2001 | Freishtat et al. |
| 6,324,524 | B1 | 11/2001 | Lent et al. |
| 6,332,134 | B1 | 12/2001 | Foster |
| 6,341,724 | B2 | 1/2002 | Campisano |
| 6,351,739 | B1 | 2/2002 | Egendorf |
| 6,477,578 | B1 | 11/2002 | Mhoon |
| 6,505,171 | B1 | 1/2003 | Cohen et al. |
| 6,675,153 | B1 | 1/2004 | Cook et al. |
| 6,704,714 | B1 | 3/2004 | O'Leary et al. |
| 6,785,661 | B1 | 8/2004 | Mandler et al. |
| 6,820,202 | B1 | 11/2004 | Wheeler et al. |
| 6,839,690 | B1 | 1/2005 | Foth et al. |
| 6,868,408 | B1 | 3/2005 | Rosen |
| 6,883,022 | B2 | 4/2005 | Van Wyngarden |
| 6,915,272 | B1 | 7/2005 | Zilliacus et al. |
| 6,957,334 | B1 | 10/2005 | Goldstein et al. |
| 6,970,853 | B2 | 11/2005 | Schutzer |
| 6,976,008 | B2 | 12/2005 | Egendorf |
| 6,980,970 | B2 | 12/2005 | Krueger et al. |
| 7,006,986 | B1 | 2/2006 | Sines et al. |
| 7,051,001 | B1 | 5/2006 | Slater |
| 7,107,243 | B1 | 9/2006 | McDonald et al. |
| 7,177,836 | B1 | 2/2007 | German et al. |
| 7,263,506 | B2 * | 8/2007 | Lee et al. ............ 705/38 |
| 2001/0034702 | A1 | 10/2001 | Mockett et al. |
| 2001/0034724 | A1 | 10/2001 | Thieme |
| 2002/0007302 | A1 | 1/2002 | Work et al. |
| 2002/0007341 | A1 | 1/2002 | Lent et al. |
| 2002/0032860 | A1 | 3/2002 | Wheeler et al. |
| 2002/0035538 | A1 | 3/2002 | Moreau |
| 2002/0052833 | A1 | 5/2002 | Lent et al. |
| 2002/0069166 | A1 | 6/2002 | Moreau et al. |
| 2002/0087467 | A1 | 7/2002 | Mascavage, III et al. |
| 2002/0099649 | A1 * | 7/2002 | Lee et al. ............ 705/38 |
| 2002/0107793 | A1 | 8/2002 | Lee |
| 2002/0112160 | A2 | 8/2002 | Wheeler et al. |
| 2002/0120537 | A1 | 8/2002 | Morea et al. |
| 2002/0120864 | A1 | 8/2002 | Wu et al. |
| 2002/0156688 | A1 | 10/2002 | Horn et al. |
| 2002/0178071 | A1 | 11/2002 | Walker et al. |
| 2002/0198822 | A1 | 12/2002 | Munoz et al. |
| 2003/0036996 | A1 | 2/2003 | Lazerson |
| 2003/0061157 | A1 * | 3/2003 | Hirka et al. ............ 705/39 |
| 2003/0120615 | A1 | 6/2003 | Kuo |
| 2003/0149656 | A1 | 8/2003 | Magruder et al. |
| 2004/0111362 | A1 | 6/2004 | Nathans et al. |
| 2004/0151292 | A1 | 8/2004 | Larsen |
| 2004/0186807 | A1 | 9/2004 | Nathans et al. |
| 2005/0038715 | A1 | 2/2005 | Sines et al. |
| 2005/0071266 | A1 * | 3/2005 | Eder ............ 705/38 |
| 2005/0125336 | A1 | 6/2005 | Rosenblatt et al. |
| 2006/0064372 | A1 | 3/2006 | Gupta |
| 2006/0174426 | A1 | 8/2006 | Ruchser |
| 2006/0178988 | A1 | 8/2006 | Egendorf |
| 2006/0184428 | A1 | 8/2006 | Sines et al. |
| 2006/0184449 | A1 * | 8/2006 | Eder ............ 705/38 |
| 2006/0184570 | A1 * | 8/2006 | Eder ............ 707/103 R |
| 2006/0226216 | A1 * | 10/2006 | Keithley et al. ............ 235/379 |
| 2006/0248016 | A1 | 11/2006 | Ginter et al. |
| 2006/0266819 | A1 * | 11/2006 | Sellen et al. ............ 235/379 |
| 2006/0289621 | A1 * | 12/2006 | Foss et al. ............ 235/375 |
| 2007/0005445 | A1 | 1/2007 | Casper |
| 2007/0038485 | A1 * | 2/2007 | Yeransian et al. ............ 705/4 |
| 2007/0056019 | A1 * | 3/2007 | Allen et al. ............ 726/1 |
| 2007/0063017 | A1 * | 3/2007 | Chen et al. ............ 235/379 |
| 2007/0080207 | A1 * | 4/2007 | Williams ............ 235/379 |
| 2007/0094114 | A1 * | 4/2007 | Bufford et al. ............ 705/35 |
| 2008/0033775 | A1 * | 2/2008 | Dawson et al. ............ 705/7 |
| 2008/0046334 | A1 * | 2/2008 | Lee et al. ............ 705/26 |
| 2008/0052244 | A1 | 2/2008 | Tsuei et al. |

FOREIGN PATENT DOCUMENTS

| | | |
|---|---|---|
| WO | WO 88/10467 A1 | 12/1988 |
| WO | WO 00/02150 A1 | 1/2000 |
| WO | WO 00/67177 A2 | 11/2000 |
| WO | WO 02/23439 A1 | 3/2002 |

* cited by examiner

METHOD AND SYSTEM FOR RISK MANAGEMENT IN A TRANSACTION

BACKGROUND OF THE INVENTION

1. Field of the Invention

The present invention relates generally to transaction systems and, in particular, to risk management, and fraud avoidance and minimization in transactions between a consumer or customer and a merchant or credit issuer.

2. Description of Related Art

In order to enable convenient purchases of goods and services by consumers, the financial service industry has developed many alternative payment methods, including checks, ATM or debit cards, credit cards or charge cards. Until the birth of virtual commerce, as discussed below, these payment options provided adequate convenience and transactional security to consumers and merchants in the marketplace. Transactional security is defined as the security offered by a payment method to the buyer and the seller in a purchase transaction so that the purchase event will not result in breach of personal information or financial loss from fraud perpetrated upon either party involved.

Virtual commerce and the growth of the Internet as a medium for commerce has put pressure on the payment options cited above on both the convenience and transactional security dimensions. Specifically, checks require physical presentment and clearing of the check prior to shipment of goods. Credit cards are more convenient for the consumer, but are subject to fraudulent use via theft of the account number, expiration date and address of the consumer. Debit cards lack a credit facility and often require a separate personal identification number (PIN) number to be used. The financial services industry is currently attempting to improve performance of existing products by introducing disposable account numbers and electronic checks. Today, all of the improvements offered have sought to improve transactional security at the expense of the convenience during the purchase process.

Each of the payment options in place today has significant shortcomings when applied to remote purchases. Remote purchases are defined as those purchases where the buyer and the seller (the merchant) are not physically proximate during the transaction. Specific examples of remote purchases are mail order, telephone order, Internet and wireless purchases.

Merchants have long battled the problem of fraudulent purchases. Each new payment option and every new sales channel (in-store, telephone, mail, and Internet) has, in turn, spawned innovation on the part of individuals willing to perpetrate fraud in order to obtain goods and services without paying for them. In recent years, the birth of the Internet commerce industry and the continued growth in mail order and telephone order commerce has pushed the credit card to the forefront of these battles. Merchants are forced to rely on credit cards because it is currently their only option in the remote purchase environment. Unfortunately, credit cards offer low transactional security to both merchants and consumers when used for remote purchases.

Low transactional security in remote purchases leads to significant costs for consumers and merchants. Consumer costs include the impairment of their credit record, the inconvenience of changing all of their credit card accounts and the financial costs of resolving the situation. Many consumers have reacted to this by avoiding remote purchasing, particularly on the Internet.

Merchant costs incurred to mitigate fraud losses include the cost of incremental labor, hardware and software to implement additional security checks in their sale/order entry software, higher transaction processing expense in the form of discount rates for credit cards and NSF fees for checks and higher fraud charge-offs for undetected fraudulent purchases.

Essentially these costs are forced onto the parties involved in the remote purchase transaction because other card-based options failed to incorporate adequate security in two ways:

1. The account number is used as a public credential along with expiration dates and very limited address information. A public credential is defined as a transaction-enabling form of identification that accesses financial balances or credit lines or credit in order to complete a purchase of goods or services. For example, in the credit card arena, account numbers are the primary enablers of access to purchase. The fact that the account number is the key to credit causes the user to focus on creating counterfeit numbers and stealing valid numbers via a variety of methods.

2. The current industry standard process for authorizing a purchase for a credit or charge card customer provides inadequate authentication to protect merchants and consumers from external cost to the remote purchase transaction. The process, instead, focuses only on whether the account in use is open and in good standing and whether there exists adequate credit available to fund the purchase. Fraud detection routines in use are typically statistically-based pattern recognition algorithms, but are not capable of authenticating a customer. In fact, the current standard authorization message formats do not support the transmission of vital authentication information from the merchant to the issuer of the credit or charge card. Some products do employ a very limited verification key built on portions of the customer's name and address, but the keys in use are not adequate to create a high level of transactional security.

Individual consumers prefer to purchase from individual merchants. Some consumers find the available acceptable payment options a barrier to purchase, for example, Internet purchases where the barriers are possession of a credit card, willingness to disclose a credit card number, inconvenience of remembering 16 digit numbers, and so on.

The alternate methods in which this problem has been solved, and their drawbacks, are as follows. Credit cards, fiat currencies and novel payment mechanisms have been one such solution. In these cases, a third party defers consumer relationship costs among multiple merchants. In operation, the consumer provides to the merchant a key provided by the trusted third party (credit card issuer) which signifies or uniquely identifies the consumer/third-party relationship. The problem is that in all cases the consumer must have a previously established relationship with the third party (credit card issuer). Huge costs of customer acquisition limit the viability of business models. Another solution has been a merchant specific bill. However, the incremental costs of rendering, collecting and administrating their own bill has a dilutive effect on merchant profitability.

One particular type of fraud is referred to as "masking". This type of fraudulent transaction is experienced by merchants, and unfortunately merchants are often left without any recourse. "Masking" occurs as follows (as illustrated in FIG. 1). A fraudster A engages in a transaction with a merchant B. This type of fraud is particularly prominent on the Internet, where anonymity is typically easy to maintain. In this particular fraudulent transaction, the fraudster A has acquired a person's private information, or even information that is easy to obtain, such as name, address, telephone number, e-mail address, etc. The fraudster A transmits data in the form of a transaction data set C to the merchant B. Based upon the provided information, the merchant B verifies or otherwise authenticates the fraudster A using data in the provided transaction data set C. Accordingly, the transaction is authorized by the merchant B.

Next, the fraudster A engages in a subsequent transaction using the victim's information. However, as seen in FIG. 1, one of the data fields may be slightly modified by the fraudster A. This modification is slight enough that the merchant B still authenticates and authorizes the transaction. The fraudster will continue this practice, again as shown in FIG. 1, slightly modifying yet another field in the transaction data set C just enough to receive authentication and approval, but not enough that the transaction is outright denied by the merchant B.

Once the victim realizes that these fraudulent transactions have occurred, in most instances, all of the transactions will be charged back to the merchant B. In the prior art, the merchant B may catch one, some or none of these fraudulent and masked transactions. Typically, the merchant B and/or the bank or credit issuer, is not equipped to spot this type of fraud.

SUMMARY OF THE INVENTION

It is an object of the present invention to provide a method and system for risk management in a transaction that overcomes the deficiencies of prior art systems. It is another object of the present invention to provide a system for risk management in a transaction that is a monitoring application for each transaction between a consumer and a merchant. It is a further object of the present invention to provide a method and system for risk management in a transaction that uses modifiable rule sets to determine whether any transaction is fraudulent or potentially fraudulent. It is a still further object of the present invention to provide a method and system for risk management that is a "self healing" or intelligent system capable of building a dynamic rule set to apply against transactions. It is a still further object of the present invention to provide a method and system for risk management in a transaction that is particularly useful for remote purchase transactions or credit transactions between a consumer and a merchant. It is yet another object of the present invention to provide a method of authorizing a transaction between a consumer and an entity, such as a merchant or credit issuer.

The present invention is directed to a risk management system for providing risk data to an entity engaged in a transaction with a consumer. The system includes an authorization denial system having: (i) an authorization denial system interface for receiving a transaction data set, with a plurality of data fields, from the entity; and (ii) a denial rule set having a plurality of rules for outputting the risk data directed to the transaction based upon the result of applying the rules to one or more data fields in the transaction data set. The authorization denial system interface transmits the resulting risk data to the entity. This risk data may be credit risks, fraud risks, profitability data, risk factors, authentication data, verification data, consumer rating data, transaction risk data, consumer risk data, denial data, processing data, etc.

In one embodiment, the system includes a risk analysis system. The risk analysis system includes: (i) a risk analysis interface for receiving the transaction data set from the authorization denial system and/or the entity; and (ii) a risk analysis rule set for outputting the risk data based upon the result of applying the rules to one or more data fields in the transaction data set. The risk management system interface transmits the resulting risk data to the entity and/or the authorization denial system.

In one embodiment, a rule from the risk analysis rule set, a new rule, an applied rule, transaction denial data, authentication denial data and/or authorization denial data is transmitted from the risk analysis system to the authorization denial system. For example, a new fraud rule may be established by the risk analysis system while processing a transaction. This new fraud rule is transmitted to the authorization denial system, and this new fraud rule is added to the denial rule set for use in subsequent transaction analysis.

The present invention is further directed to a method of authorizing a transaction between a consumer and an entity. This method includes the steps of: receiving a transaction data set including a plurality of data fields; applying a denial rule set having a plurality of rules to at least one of the data fields in the transaction data set, thereby providing risk data; and transmitting the risk data to the entity. The entity may be a merchant, a credit issuer, a company, a corporation, a seller, a service provider, etc. Further, the transaction may be a credit account offered by a credit issuer, a credit account offered by a merchant, a credit account request by a consumer, a purchase request by a consumer, an item purchase transaction, a service purchase transaction, etc.

The present invention is further directed to a method of authorizing a transaction between a consumer and an entity. This method includes the steps of: receiving, at an authorization denial system interface, a transaction data set including a plurality of data fields; applying a denial rule set having a plurality of rules to at least one of the data fields in the transaction data set, thereby providing risk data; transmitting a denial instruction to the entity if the resulting risk data indicates that the transaction should be denied based upon the applied rule; and transmitting the transaction data set to a risk analysis system if the resulting risk data indicates that the transaction should not be denied based upon the applied rule.

The present invention, both as to its construction and its method of operation, together with the additional objects and advantages thereof, will best be understood from the following description of exemplary embodiments when read in connection with the accompanying drawings.

DESCRIPTION OF THE PREFERRED EMBODIMENTS

It is to be understood that the invention may assume various alternative variations and step sequences, except where expressly specified to the contrary. It is also to be understood that the specific devices and processes illustrated in the attached drawings, and described in the following specification, are simply exemplary embodiments of the invention.

Figure 1:
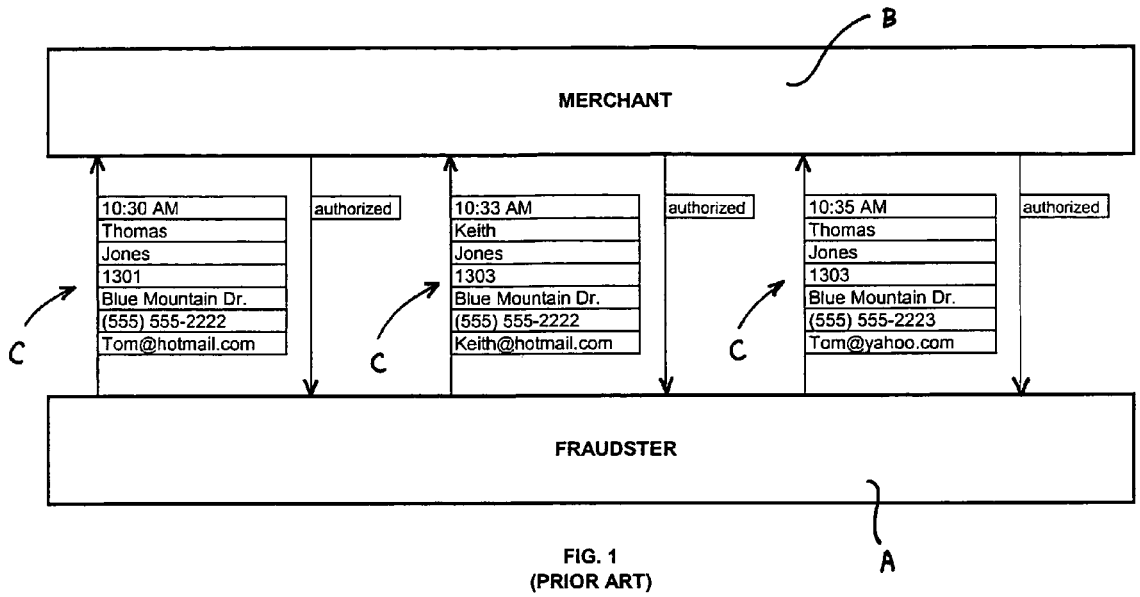
FIG. 1 is a schematic view of a series of fraudulent transactions between a fraudster and a merchant according to the prior art.
Figure 2:
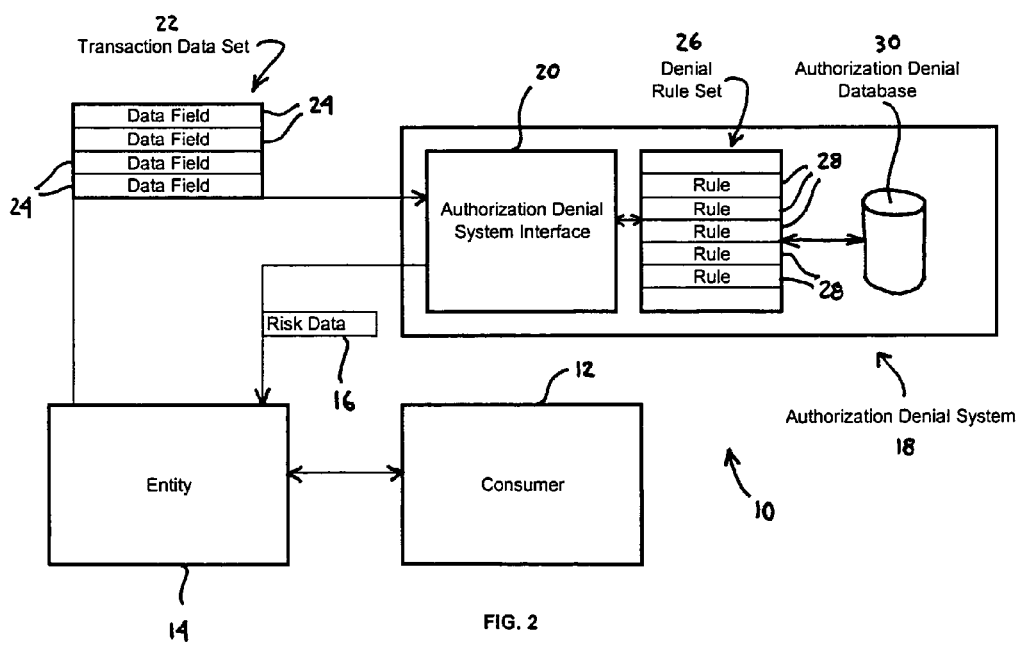
FIG. 2 is a schematic view of one embodiment of a method and system for risk management in a transaction according to the present invention.
Figure 3:
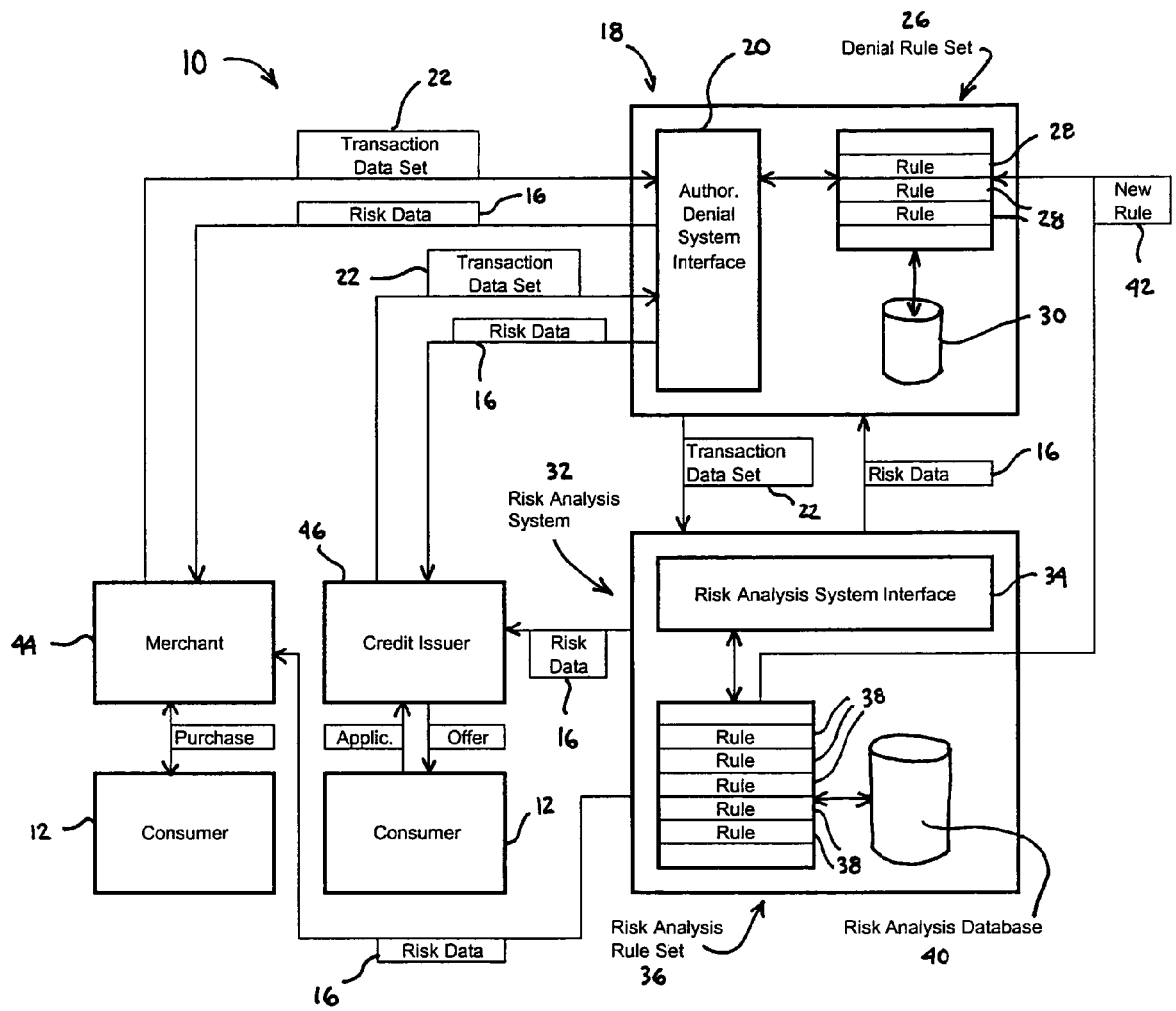
FIG. 3 is a schematic view of a further embodiment of a method and system for risk management in a transaction according to the present invention.
Figure 4:
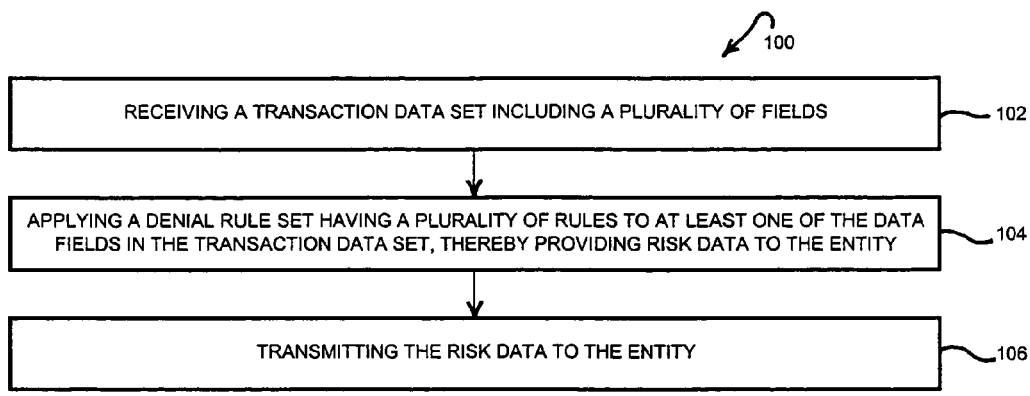
FIG. 4 is a flow diagram of a method of authorizing a transaction between a consumer and an entity according to the present invention.

The present invention is directed to a risk management system 10 for use in connection with a transaction between a consumer 12 and an entity 14. Further, the present invention is directed to a method of authorizing the transaction between the consumer 12 and the entity 14. Schematic diagrams of various embodiments of the system 10 are illustrated in FIGS. 2 and 3. In addition, a flow diagram illustrating one embodiment of the method according to the present invention is provided in FIG. 4.

In one embodiment, the risk management system 10 is implemented in order to provide risk data 16 to the entity 14 engaged in a transaction with the consumer 12. The system 10 includes an authorization denial system 18. This authorization denial system 18 includes an authorization denial system interface 20 for receiving a transaction data set 22 from the entity 14, and the transaction data set 22 includes multiple data fields 24 therein. The authorization denial system 18 also includes a denial rule set 26 having multiple rules 28. The denial rule set 26 outputs the risk data 16 based upon the application of one or more of the rules 28 in the denial rule set 26 to one or more of the data fields 24 in the transaction data set 22. Accordingly, based upon the denial rule set 26 application to the incoming transaction data set 22, the desired risk data 16 is output. Finally, the authorization denial system interface 20 transmits this resulting risk data 16 to the entity 14. See FIG. 2.

The risk data 16 provided to the entity 14 can be in many forms, and is generally used to assist the entity 14 in making a decision regarding how to interact in the transaction with the consumer 12. For example, the risk data 16 may be indicative of credit risk, fraud risk, profitability data, risk factors, authentication data, verification data, consumer rating data, transaction risk data, consumer risk data, denial data, processing data, etc. For example, in one embodiment, the risk data 16 that is transmitted to the entity 14 is denial data, which advises the entity 14 to deny the transaction with the consumer 12, deny a purchase request by the consumer 12, deny a credit request by the consumer 12, and/or take some other specified action with respect to the consumer 12. In one embodiment, this denial data may instruct the entity 14 to withhold the provided credit card, temporarily revoke the account or even notify the authorities.

In one embodiment, the risk data 16 provided is denial data, which results from an application of the denial rule set 26 to the transaction data set 22. In this embodiment, the denial rule set 26 is considered a "negative" rule set, wherein only a denial instruction is provided to the entity 14. Therefore, the denial rule set 26, in this embodiment, acts as an initial filter that immediately informs the entity 14 that the transaction is suspect and should not be engaged in or completed. Accordingly, the denial rule set 26 in the authorization denial system 18 acts as a filter to provide the entity 14 with immediate risk data 16 for making decisions. Further, the authorization denial system 18 is dynamic and quickly accessible by the entity 14 for making decisions at the point-of-sale before the transaction is complete.

The transaction data set 22 typically includes multiple data fields 24 that completely describe the transaction, the consumer 12, the entity 14 (such as a merchant) and similar factors. For example, the data fields 24 may reflect certain demographic data of the consumer 12 for use in connection with the denial rule set 26. Any number of data fields 24 are envisioned, for example, the data fields 24 may be populated with data reflecting a consumer's name, an account number, an address, a city, a state, a zip code, a country, a telephone number, an e-mail address, a social security number, a date of birth, the merchant's name, an identification, an order number, an authorization number, an authorization time, an authorization amount, a ship-to address, a bill-to address, a transaction amount, a consumer purchase demographic, a transaction date, a transaction type, a product identification, a service identification, shipping costs, delivery type, customer type, a company identity, a merchant identity, a third-party risk score, risk data, authentication data, verification data, consumer rating data, profitability data, credit risk data, fraud risk data, transaction risk data, denial data, processing data, a general credit risk score, a credit bureau risk score, a prior approval, prior report data, previous transaction data, a geographical risk factor, credit account data, bankcard balance data, delinquency data, credit segment data, time between transactions data, previous transaction amount, previous transaction approval status, previous transaction time stamp data, a response code, active trades in database, public record data, trade line data, transaction medium, credit segment data, consumer payment type, consumer payment method, consumer payment history, consumer account history, consumer credit account balance, merchant history, private label entity data, affiliated private label entity, etc.

In order to facilitate speed, efficient processing and immediate access to the risk data 16 by the entity 14, the rules 28 and the denial rule set 26 are typically applied to data fields 24 populated with demographic data. For example, this demographic data may include a consumer's name, an address, a ship-to address, a bill-to address, a social security number, an e-mail address, a telephone number, an Internet address, an account number, etc. This demographic data would be checked against or applied with respect to the rules 28 and the denial rule set 26, which may act as a table having fields or data that, if found in the transaction data set 22, prompts a denial instruction. This denial instruction may also include an expiration stamp, such that the real customer or consumer 12 (as opposed to the fraudster A) can eventually use or unlock his or her account.

In this manner, a transaction denial instruction can be provided to the entity 14 before the transaction is complete between the entity 14 and the consumer 12. In addition, this denial rule set 26 is modifiable, dynamic and configurable. Further, the denial rule set 26 may be in communication with an authorization denial system database 30. This database includes data and data fields that can be used in connection with the denial rule set 26, and the application of the denial rule set 26 to the transaction data set 22. For example, as discussed above, the authorization denial system database 30 may include data that, if found in the transaction data set 22, prompts an immediate denial instruction from the authorization denial system 18 to the entity 14.

In another embodiment, the risk management system 10 includes a risk analysis system 32. The risk analysis system 32 includes a risk analysis system interface 34, which receives the transaction data set 22 (or some portion thereof) from the authorization denial system 18 and/or the entity 14. Further, the risk analysis system 32 includes a risk analysis rule set 36 having multiple rules 38 therein. The rules 38 of the risk analysis rule set 36 are applied to one or more of the data fields 24 in the transaction data set 22, which results in the above-discussed risk data 16. This risk data 16 is transmitted by the risk analysis system interface to either the authorization denial system 18 and/or the entity 14.

As discussed above, this risk data 16 may be credit risk, fraud risk, profitability data, risk factors, authentication data, verification data, consumer rating data, transaction risk data, consumer risk data, denial data, processing data, etc. Further, the risk data 16, which in a preferred embodiment is transmitted to the authorization denial system 18, is denial data advising the entity 14 to deny the transaction, deny a purchase request, deny a credit request, or take some other specified action with respect to the consumer 12. Typically, the risk analysis system 32, and specifically the risk analysis rule set 36, is applied to a greater subset of data fields 24 in the transaction data set 22. In particular, the risk analysis rule set 36 is a larger and more comprehensive analytical tool in the risk management system 10.

The risk analysis rule set 36 may be in communication with a risk analysis system database 40. This risk analysis system database 40 is populated with data or data fields for use in connection with the risk analysis rule set 36 in application of the rules 38 to the data fields 24 in the transaction data set 22. The communication between the risk analysis system 32 and the authorization denial system 18 provides for the transmission of a rule 38 from the risk analysis rule set 36, a new rule, an applied rule, transaction denial data, authentication denial data and/or authorization denial data between the systems 18, 32. In one embodiment, a new rule 42, such as a new fraud rule, is transmitted from the risk analysis system 32 to the authorization denial system 18. This new rule 42 is then added to the denial rule set 26 for use in subsequent transaction analysis. Therefore, when the risk analysis system 32 analyzes a transaction and the transaction data set 22, it may identify new patterns, rules or data that would have resulted in an immediate denial instruction by the authorization denial system 18 if it had access to this information. Therefore, the new rule 42 allows the denial rule set 26 to be updated appropriately, which, in turn, makes the authorization denial system 18 a "self healing" system.

The risk analysis rule set 36, as discussed above, typically analyzes the vast majority of the data fields 24 and the transaction data set 22. Further, the risk analysis database 40 can be a specially-constructed database that employs a much larger and more robust rule set 36. After the transaction data set 22 has made it through the authorization denial system 18, and if the transaction data set 22 makes it through the risk analysis system rule set 36, the risk data 16 would include an instruction to the entity 14 that it may move forward with the transaction with the consumer 12. As with the denial rule set 26, the risk analysis rule set 36 is modifiable, dynamic and configurable. The entity 14 may be a merchant 44, a credit issuer 46, a company, a corporation, a seller, a service provider, etc.

In one embodiment, as illustrated in FIG. 3, the consumer 12 makes a purchase request to the merchant 44, for example, requesting to purchase an item, a service, etc. Before completing this transaction, and after gathering the appropriate data and information from the consumer 12, the merchant 44 transmits the transaction data set 22 to the authorization denial system 18. After processing according to the above-described process, the risk data 16 is sent to the merchant 44 for making a decision regarding how to continue the transaction. As discussed above, in one preferred embodiment, the risk data 16 is the suggestion to deny the transaction with the consumer 12, based upon the application of the denial rule set 26 to the transaction data set 22. Therefore, prior to finalizing the transaction with the consumer 12, whether that consumer is a fraudster A or other credit risk, a merchant 44 is able to terminate the transaction.

This process is also useful in connection with the credit issuer 46, also as illustrated in FIG. 3. The credit issuer 46 may make some offer for credit to a consumer 12, such as through well-known methods. In this example, the transaction is this credit offer and/or request process. Next, the consumer 12 either attempts to accept the credit offer or otherwise applies for credit with the credit issuer 46. As discussed above in connection with the merchant 44, the credit issuer 46 sends the transaction data set 22 to the authorization denial system 18, and the risk data 16 is sent back to the credit issuer 46 for making a decision whether to extend credit to the consumer 12. Accordingly, the credit issuer 46 can decide to terminate the transaction or otherwise refuse to extend to the consumer 12 before the transaction is complete.

In both of the above-discussed examples, the use of the risk analysis system 32 adds further benefit to the invention. In particular, the use of the risk analysis system 32 and, in particular, the risk analysis rule set 36, allows for a more detailed review of the transaction data set 22 in order to provide the appropriate risk data 16 to either the merchant 44 or the credit issuer 46.

The present invention is further directed to a method 100 of authorizing a transaction between a consumer 12 and an entity 14. This method is illustrated in schematic form in FIG. 4. In particular, the method 100 includes the steps of: receiving a transaction data set 22 including a plurality of data fields 24 (Step 102); applying a denial rule set 26 having a plurality of rules 28 to at least one of the data fields 24 in the transaction data set 22, thereby providing risk data 16 (Step 104); and transmitting the risk data 16 to the entity 14 (Step 106). In a further embodiment of the method 100, this method 100 includes the further steps of transmitting a denial instruction to the entity 14 if the resulting risk data 16 indicates that the transaction should be denied based upon the applied rule 28; and transmitting the transaction data set 22 to the risk analysis system 32, if the resulting risk data 16 indicates that the transaction should not be denied based upon the applied rule 28.

The present invention provides a system 10 and method 100 that reduces the merchant 44 and credit issuer 46 risk in a transaction. For example, the system 10 and method 100 provide an increased defense against "masking" fraud and similar identity theft variations. Still further, the system 10 and method 100 allow the merchant 44 and/or the credit issuer 46 to spot such fraud and take action prior to the completion of the transaction. Still further, the present invention provides a system 10 and method 100 that provide a dynamic authorization denial system 18 with a configurable and robust denial rule set 26, which can be supplemented with new rules from the risk analysis system 32. In this manner, the system 10 and method 100 of the present invention reduce the chances of fraud propagated on the merchant 44 and credit issuer 46, provide the merchant 44 and credit issuer 46 with immediate and useful risk data 16, and represent a cost savings to both the entity 14 and the consumer 12 based upon this fraud reduction.

This invention has been described with reference to the preferred embodiments. Obvious modifications and alterations will occur to others upon reading and understanding the preceding detailed description. It is intended that the invention be construed as including all such modifications and alterations.

The invention claimed is:

1. A risk management system for providing risk data to an entity engaged in a remote transaction with a consumer, the system comprising: an authorization denial system including: (i) an authorization denial system interface configured to receive a transaction data set having a plurality of data fields from the entity; and (ii) a denial rule set having a plurality of rules and configured to output the risk data directed to the transaction based upon the result of applying at least one rule of the plurality of rules to at least one data field of the plurality of data fields in the transaction data set; wherein the authorization denial system interface transmits the resulting risk data to the entity; and a risk analysis system including: (i) a risk analysis interface configured to receive the transaction data set from at least one of the authorization denial system and the entity; and (ii) a risk analysis rule set having a plurality of rules and configured to output the risk data directed to the transaction based upon the result of applying at least one rule of the plurality of rules to at least one data field of the plurality of data fields in the transaction data set; wherein the risk analysis system interface transmits the resulting risk data to at least one of the entity and the authorization denial system; wherein the risk analysis system is further configured to: (i) establish a new fraud rule; and (ii) transmit the new fraud rule to the authorization denial system; wherein the new fraud rule is added to the denial rule set for use in subsequent transaction analysis.

2. The system of claim 1, wherein the risk data transmitted to the entity is at least one of credit risk, fraud risk, profitability data, risk factors, authentication data, verification data, consumer rating data, transaction risk data, consumer risk data, denial data and processing data.

3. The system of claim 1, wherein the risk data transmitted to the entity is denial data advising the entity to at least one of deny the transaction, deny a purchase request, deny a credit request and take a specified action with respect to the consumer.

4. The system of claim 1, wherein the at least one of the data fields in the transaction data set is populated with data reflecting a consumer's name, an account number, an address, a city, a state, a zip code, a country, a telephone number, an e-mail address, a social security number, a date of birth, the merchant's name, an identification, an order number, an authorization number, an authorization time, an authorization amount, a ship-to address, a bill-to address, a transaction amount, a consumer purchase demographic, a transaction date, a transaction type, a product identification, a service identification, shipping costs, delivery type, customer type, a company identity, a merchant identity, a third-party risk score, risk data, authentication data, verification data, consumer rating data, profitability data, credit risk data, fraud risk data, transaction risk data, denial data, processing data, a general credit risk score, a credit bureau risk score, a prior approval, prior report data, previous transaction data, a geographical risk factor, credit account data, bankcard balance data, delinquency data, credit segment data, time between transactions data, previous transaction amount, previous transaction approval status, previous transaction time stamp data, a response code, active trades in database, public record data, trade line data, transaction medium, credit segment data, consumer payment type, consumer payment method, consumer payment history, consumer account history, consumer credit account balance, merchant history, private label entity data and affiliated private label entity.

5. The system of claim 1, wherein the at least one rule is applied to at least one of the data fields in the transaction data set, wherein the at least one data field is populated with demographic data.

6. The system of claim 5, wherein the demographic data is at least one of consumer's name, an address, a ship-to address, a bill-to address, a social security number, an e-mail address, a telephone number, an Internet address and an account number.

7. The system of claim 1, wherein the risk data transmitted to the entity is a transaction denial instruction.

8. The system of claim 1, wherein the denial rule set is at least one of modifiable, dynamic and configurable.

9. The system of claim 1, wherein the denial rule set is in communication with an authorization denial system database populated with at least one of data and data fields, wherein the at least one of data and data fields is utilized in connection with the denial rule set and the application of the denial rule set.

10. The system of claim 1, wherein the risk data transmitted to the at least one of the entity and the authorization denial system is denial data advising the entity to at least one of deny the transaction, deny a purchase request, deny a credit request and take a specified action with respect to the consumer.

11. The system of claim 1, wherein the risk analysis rule set is in communication with a risk analysis system database populated with at least one of data and data fields, wherein the at least one of data and data fields is utilized in connection with the risk analysis rule set and the application of the risk analysis rule set.

12. The system of claim 1, wherein at least one of a rule from the risk analysis rule set, a new rule, an applied rule, transaction denial data, authentication denial data and authorization denial data is transmitted from the risk analysis system to the authorization denial system.

13. The system of claim 1, wherein the risk analysis rule set is at least one of modifiable, dynamic and configurable.

14. The system of claim 1, wherein the entity is at least one of a merchant, credit issuer, a company, a corporation, a seller and a service provider.

15. The system of claim 1, wherein the transaction is at least one of a credit account offer by a credit issuer, a credit account offer by a merchant, a credit account request by a consumer, a purchase request by a consumer, an item purchase transaction and a service purchase transaction.

16. A method of authorizing a remote transaction between a consumer and an entity, comprising:
  receiving a transaction data set including a plurality of data fields;
  applying a denial rule set having a plurality of rules to at least one of the data fields in the transaction data set, thereby providing risk data;
  transmitting the risk data to the entity;
  establishing a new rule based upon the transaction data set;
  transmitting the new rule to the denial rule set; and
  adding the new rule to the denial rule set for use in subsequent transaction analysis.

17. The method of claim 16, wherein the risk data transmitted to the entity is at least one of credit risk, fraud risk, profitability data, risk factors, authentication data, verification data, consumer rating data, transaction risk data, consumer risk data, denial data and processing data.

18. The method of claim 16, wherein the risk data transmitted to the entity is denial data advising the entity to at least one of deny the transaction, deny a purchase request, deny a credit request and take a specified action with respect to the consumer.

19. The method of claim 16, wherein the risk data transmitted to the entity is a transaction denial instruction.

20. The method of claim 16, further comprising modifying the denial rule set.

21. The method of claim 16, further comprising:
  receiving the transaction data set;
  applying a risk analysis rule set having a plurality of rules to at least one of the data fields in the transaction data set, thereby providing risk data; and
  transmitting the risk data to at least one of the entity and an authorization denial system.

22. The method of claim 21, wherein the risk analysis rule set is in communication with a risk analysis system database populated with at least one of data and data fields, wherein the at least one of data and data fields is utilized in connection with the risk analysis rule set and the application of the risk analysis rule set.

23. The method of claim 21, wherein at least one of a rule from the risk analysis rule set, a new rule, an applied rule, transaction denial data and authorization denial data is transmitted to an authorization denial system including the denial rule set.

24. The method of claim 16, wherein the entity is at least one of a merchant, a credit issuer, a company, a corporation, a seller and a service provider.

25. The method of claim 16, wherein the transaction is at least one of a credit account offer by a credit issuer, a credit account offer by a merchant, a credit account request by a consumer, a purchase request by a consumer, an item purchase transaction and a service purchase transaction.

26. A system for authorizing a remote transaction between a consumer and an entity, comprising:
- means for receiving a transaction data set including a plurality of data fields;
- means for applying a denial rule set having a plurality of rules to at least one of the data fields in the transaction data set, thereby providing risk data;
- means for transmitting the risk data to the entity;
- means for establishing a new rule based upon the transaction data set;
- means for transmitting the new rule to the denial rule set; and
- means for adding the new rule to the denial rule set for use in subsequent transaction analysis.

* * * * *